US010800576B1

(12) United States Patent
Hong Sin

(10) Patent No.: US 10,800,576 B1
(45) Date of Patent: Oct. 13, 2020

(54) METALLIC PALLET SYSTEM WITH SKI-SHAPED FEET

(71) Applicant: Tan Hong Sin, Malacca (MY)

(72) Inventor: Tan Hong Sin, Malacca (MY)

( * ) Notice: Subject to any disclaimer, the term of this patent is extended or adjusted under 35 U.S.C. 154(b) by 0 days.

(21) Appl. No.: 16/442,657

(22) Filed: Jun. 17, 2019

(51) Int. Cl.
*B65D 19/08* (2006.01)

(52) U.S. Cl.
CPC .... *B65D 19/08* (2013.01); *B65D 2519/00024* (2013.01); *B65D 2519/00059* (2013.01); *B65D 2519/0096* (2013.01); *B65D 2519/00159* (2013.01); *B65D 2519/00174* (2013.01); *B65D 2519/00273* (2013.01); *B65D 2519/00975* (2013.01)

(58) Field of Classification Search
CPC ............... B65D 19/00; B65D 19/0018; B65D 19/0097; B65D 19/08; B65D 2519/00024; B65D 2519/00059; B65D 2519/00159; B65D 2519/00174; B65D 2519/00273; B65D 2519/0096; B65D 2519/00975
USPC ...... 108/51.11, 53.1, 53.3, 55.1, 56.1, 57.16, 108/57.24, 57.32; 206/386
See application file for complete search history.

(56) References Cited

U.S. PATENT DOCUMENTS

| | | | | |
|---|---|---|---|---|
| 1,876,807 A | * | 9/1932 | Walp | B65D 19/0028 108/53.3 |
| 2,622,830 A | * | 12/1952 | Coit, Jr. | B65D 19/0018 206/599 |
| 3,616,766 A | * | 11/1971 | Weiss | B65D 19/0097 108/57.18 |
| 3,759,193 A | * | 9/1973 | Branch | B65D 19/0097 108/53.3 |
| 3,797,727 A | | 3/1974 | Downing et al. | |
| 5,460,103 A | * | 10/1995 | Dunn | B65D 19/0018 108/57.18 |
| 5,494,167 A | * | 2/1996 | Hasegawa | B65D 7/24 108/56.1 |
| 5,507,237 A | * | 4/1996 | Barrow | B65D 19/08 108/53.1 |
| 5,667,065 A | | 9/1997 | Fahrion | |

(Continued)

FOREIGN PATENT DOCUMENTS

| | | |
|---|---|---|
| CN | 108394610 A | 8/2018 |
| DE | 4414215 A1 | 10/1995 |

(Continued)

*Primary Examiner* — Bryon P Gehman
(74) *Attorney, Agent, or Firm* — Brown & Michaels, PC

(57) ABSTRACT

A pallet system with a reusable metal pallet base and a reusable collapsible corrugated carton or box. The pallet has a rectangular outer perimeter frame and a rectangular inner perimeter frame located inside the rectangular outer perimeter frame. The pallet includes four middle angular member junctions located between the rectangular inner perimeter frame and the rectangular outer perimeter frame and eight ski-shaped feet mounted to the side elements of the inner perimeter frame and to the side bars of the outer perimeter frame. Each of the corner angular member junctions and the middle angular member junctions has an upward-extending flange. The ski-shaped feet and the upward-extending flanges are arranged such that when two reusable metal pallets are stacked, the ski-shaped feet of an upper pallet nests and the upward-extending flanges partially cover an outer surface of the outer peripheral frame of the upper pallet.

20 Claims, 13 Drawing Sheets

(56) References Cited

U.S. PATENT DOCUMENTS

| | | |
|---|---|---|
| 6,386,365 B1 | 5/2002 | Tan |
| 6,510,801 B2 | 1/2003 | Tan |
| 7,802,526 B2 | 9/2010 | Brady et al. |
| 7,987,796 B2 * | 8/2011 | Nordstrom ......... B65D 19/0095 |
| | | 108/53.3 |
| 9,278,779 B2 | 3/2016 | Funaki |
| 9,440,770 B2 * | 9/2016 | Mueller ............. B65D 19/0034 |
| 9,873,546 B2 | 1/2018 | Burkardt et al. |
| 2008/0223262 A1 * | 9/2008 | Chew ................. B65D 19/0075 |
| | | 108/53.3 |
| 2014/0021090 A1 | 1/2014 | Meyer-Horn |
| 2017/0197752 A1 | 7/2017 | Imbrecht et al. |
| 2018/0127148 A1 | 5/2018 | Kuhn et al. |
| 2018/0201404 A1 | 7/2018 | Lam et al. |

FOREIGN PATENT DOCUMENTS

| | | | |
|---|---|---|---|
| FR | 2180454 A1 | 11/1973 | |
| GB | 1521077 | 8/1978 | |
| JP | H09165040 A | 6/1997 | |
| KR | 2012000524 U * | 1/2012 | ............ B65D 19/08 |
| WO | 2018007778 A1 | 1/2018 | |
| WO | 2018206585 A1 | 11/2018 | |

* cited by examiner ated May 14, 2002.

METALLIC PALLET SYSTEM WITH SKI-SHAPED FEET

BACKGROUND OF THE INVENTION

Field of the Invention

The invention pertains to the field of storage. More particularly, the invention pertains to pallets used in storage and transportation.

Description of Related Art

The traditional pallet is a flat platform on which goods to be shipped can be stacked or fastened. Pallets are traditionally made of off cuts of timber, and have been discarded as industrial waste. Typically, these wood pallets require fumigation with environmentally harmful chemicals to prevent introducing harmful pathogens or insects with the wood.

Plastic pallets, or nesting stacking containers, are known to the art, such as the present inventor's U.S. Pat. No. 6,386,365 "Nesting stacking crate", issued May 14, 2002.

Metal pallets are also known, such as the present inventor's U.S. Pat. No. 6,510,801 "Pallet for shrink-wrapped packaging of block rubber", issued Jan. 28, 2003.

Cartons or boxes are commonly used to ship materials and goods of all sorts, usually with walls made of cardboard or plastic or fiber material, or a combination such materials. These walls most often have layers of flat sheet material bonded to layers of fluted material, resulting in a light, strong structure. Such walls are referred to as "corrugated" material. For the purposes of this disclosure, the term "corrugated carton" is intended to encompass such cartons or boxes, regardless of the exact material used in the corrugated walls.

For shipping collections of smaller containers or bulk goods, pallet systems have been developed, usually using wood or metal pallets, with a wall component (either collapsible or not) to secure or protect the goods on top of the pallet. Some systems include a top cover for its packaging system, and some use frame and post elements at corners for assembly of the packaging. Some of these systems have special connections between the base and wall component, especially when base and wall are of different materials.

Such pallet systems can be stacked, one upon another, and such stacking requires some means for the forks of a forklift to extend between layers of pallet systems so as to be able to stack and unstack the systems. Stackable pallet systems of the prior art have an additional pallet top/cover for a two-tier stacking system. This multi-part system requires maintenance and housekeeping, with bits and pieces of the system here and there, requiring assembly before use. This gives rise to concerns about the packaging system not being able to function due to missing parts, etc.

In today's shipping world, it is important that packaging systems be able to be loaded into an ISO-standard cargo container. Optimally, the system will utilize the maximum capacity of the cargo container as fully as practicable, minimizing any void space between the packaging system and the container itself. The structure or upright erect form of the stacked packaging systems should have minimal lateral movements or disturbances to the packaged goods. Existing packaging systems fall short of this optimum.

An example of a prior art stackable packaging system is U.S. Pat. No. 5,667,065, "Stackable packaging unit", issued Sep. 16, 1997, in which there is an additional pallet top/cover used when stacking the units of this packaging. If two-tier stacking were to take place, the packaging unit will consist of two pallet bases, one pallet top/cover and two pieces of lateral/peripheral wall components. During two-tier stacking, the legs of the top pallet encroach inside the available internal volume capacity, which in turn takes away some of the storage capacity and also requires an additional component (pallet cover) in order to receive the pallet in place.

The present inventor's U.S. Pat. No. 6,386,365 also discloses the concept of having a collapsible form of a wall, the wall is fixed to one type of material, size or form and is easily erected and collapsed back after use giving more time savings. In addition, there is flexibility in choice of wall materials where a much lighter option can be adopted for use with the "invention" compared to the previous device's fixed material and component which results in reduced overall weight for better handling, storage and transport

SUMMARY OF THE INVENTION

The pallet system has two components: a reusable metal pallet base and a reusable collapsible corrugated carton or box to replace, or substitute, for wood base pallets, plastic pallets, plastic drum and metal crates, or plastic intermediate bulk containers (IBC).

The pallet system can be used for transporting virtually any bulk containerized good such as liquids (using a liquid bladder), cargo in powder form such as plastic resin, black carbon, or any other cargo capable of fitting inside the carton or box.

The reusable pallet system maximizes warehouse space utilization, creates cost efficient logistics, and provides an environmentally sustainable system to transition from the obsolete throw-away versions of disposable pallets to reducing waste through using a pallet repeatedly. The pallet system can be used in multiple applications across multiple industries, nested neatly for storage in a space efficient manner, and is logistically cost effective in transportation.

DETAILED DESCRIPTION OF THE INVENTION

Figure 2:
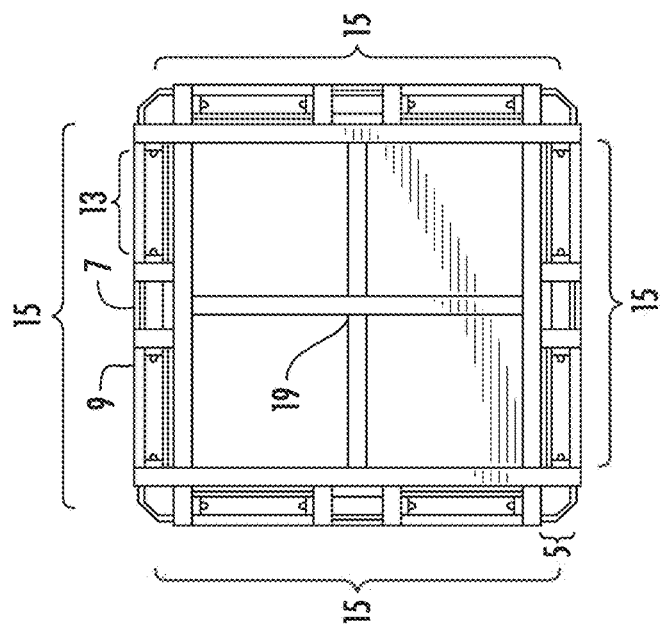
FIG. 2 shows a front view of the bottom of the base pallet with quarter hexagonal corners.
Figure 1:
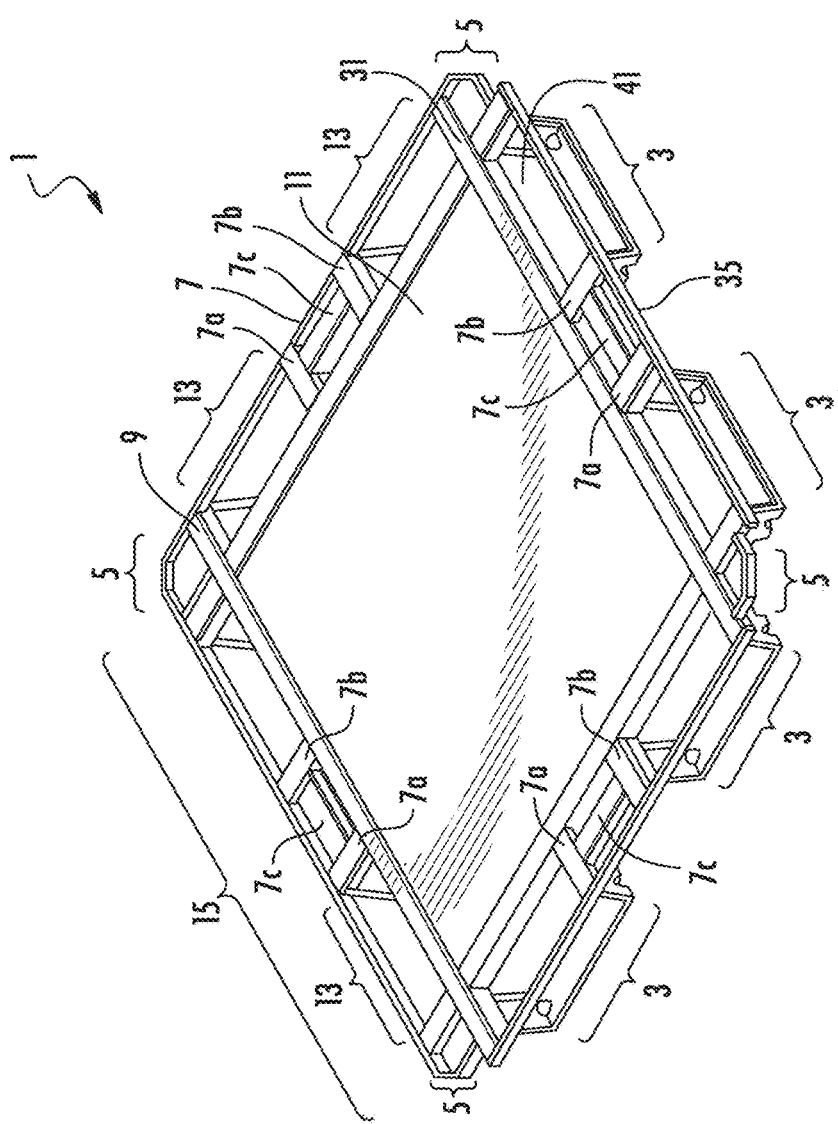
FIG. 1 shows an isometric view of the base pallet with quarter hexagonal corners.
Figure 3:
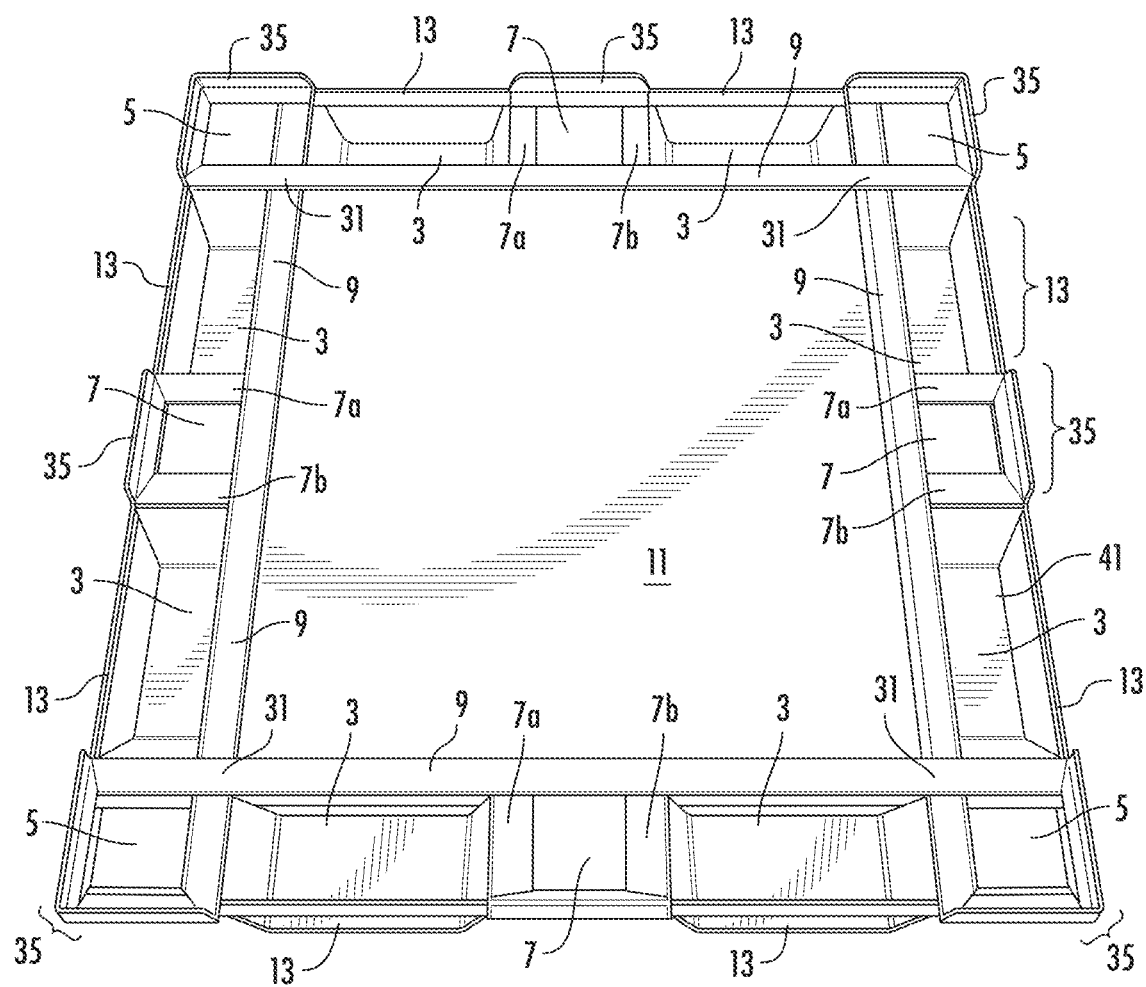
FIG. 3 shows a perspective view of the base pallet with right angle corners.
Figure 4:
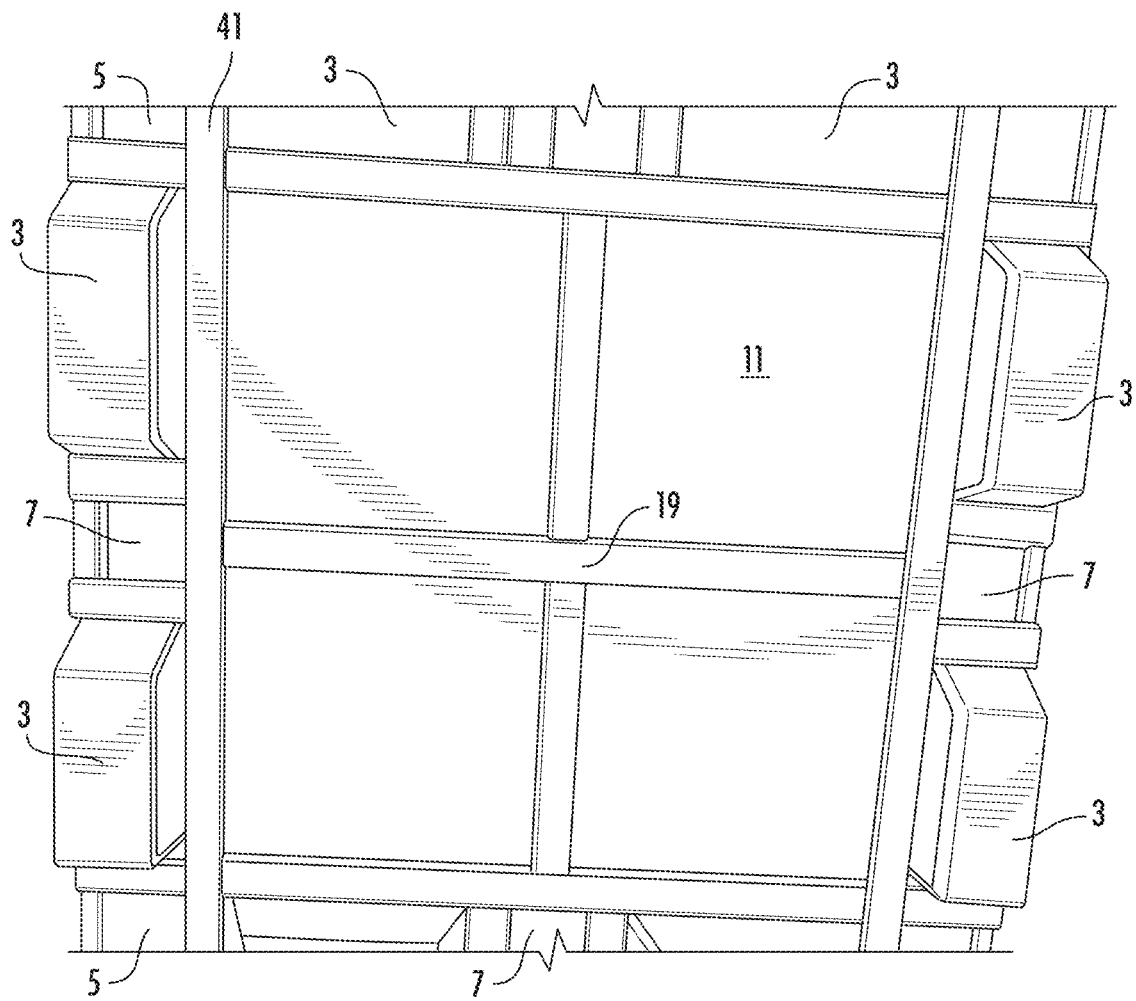
FIG. 4 shows a front view of the bottom of the base pallet with right angle corners.
Figure 5:
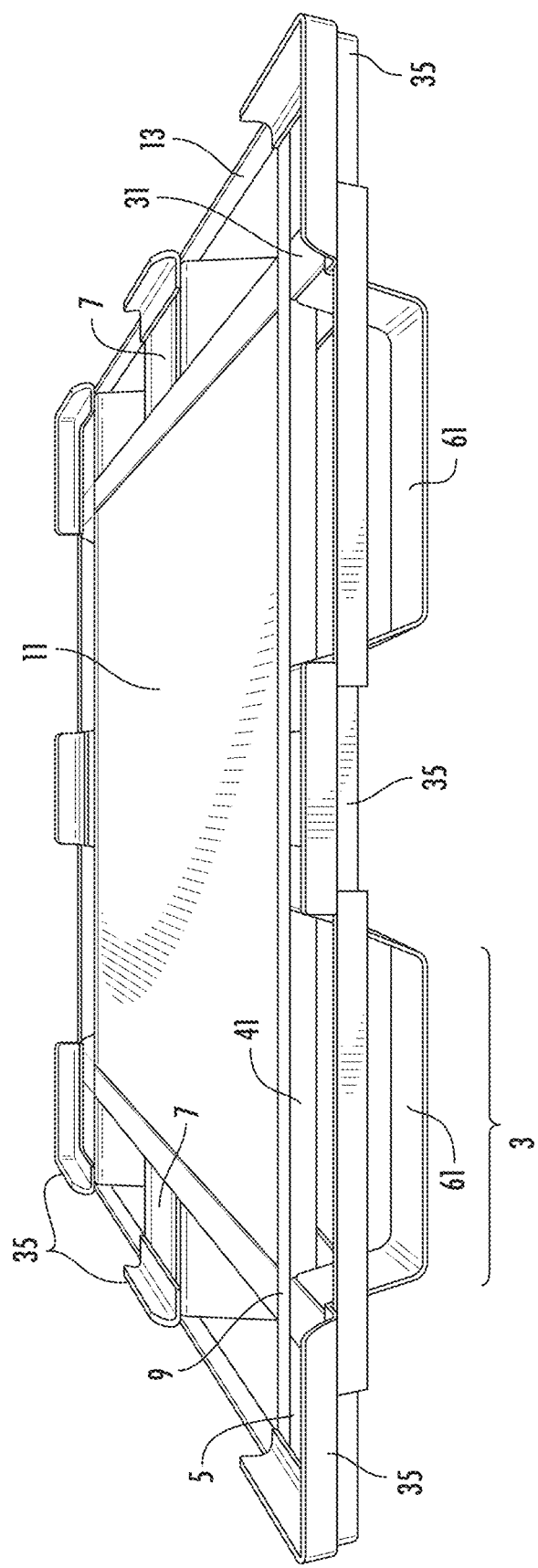
FIG. 5 shows a perspective view of the base pallet with right angle corners.
Figure 6:
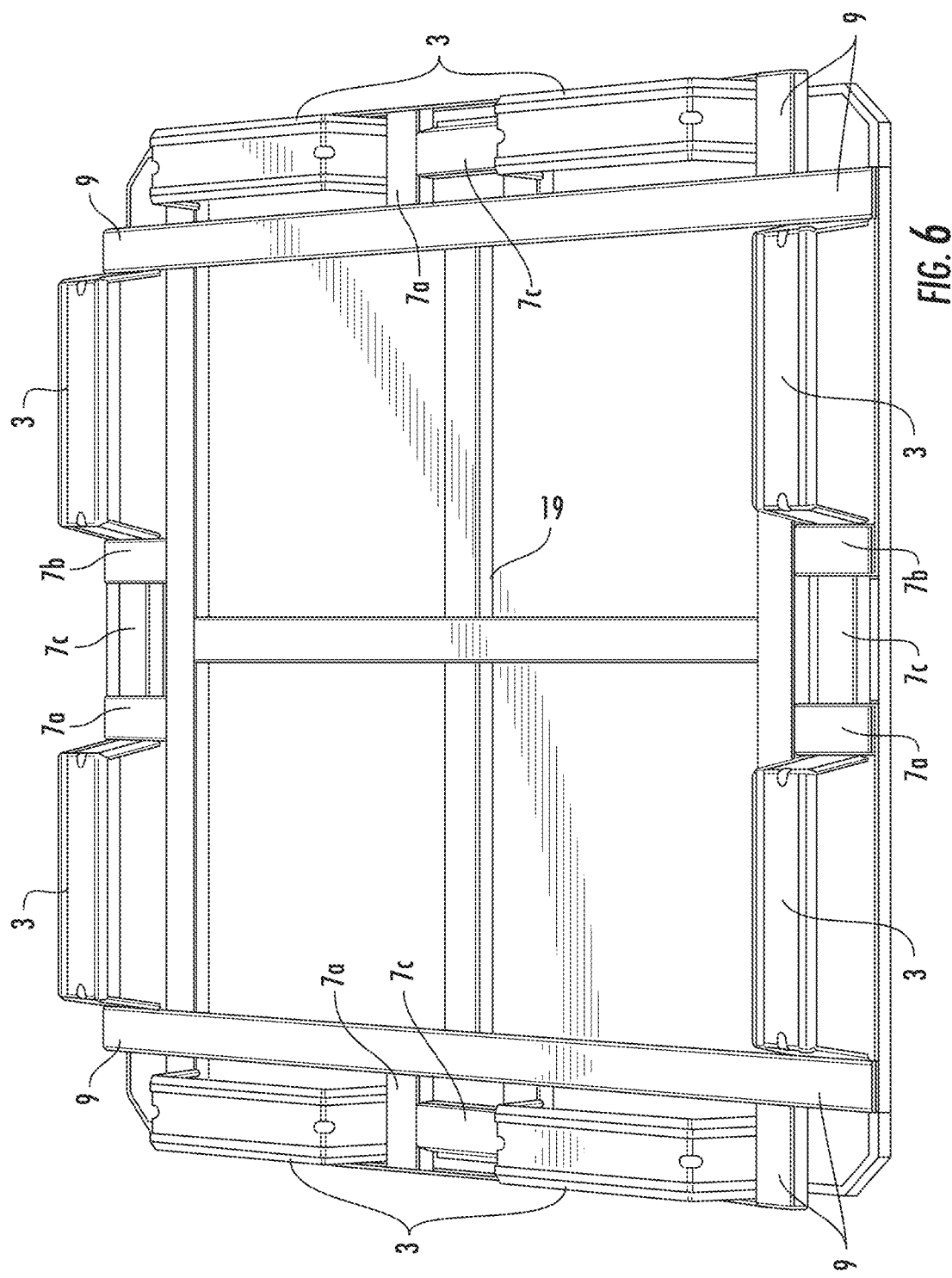
FIG. 6 shows an enlarged front view of an embodiment of the bottom of the base pallet with quarter hexagonal corners.
Figure 7:
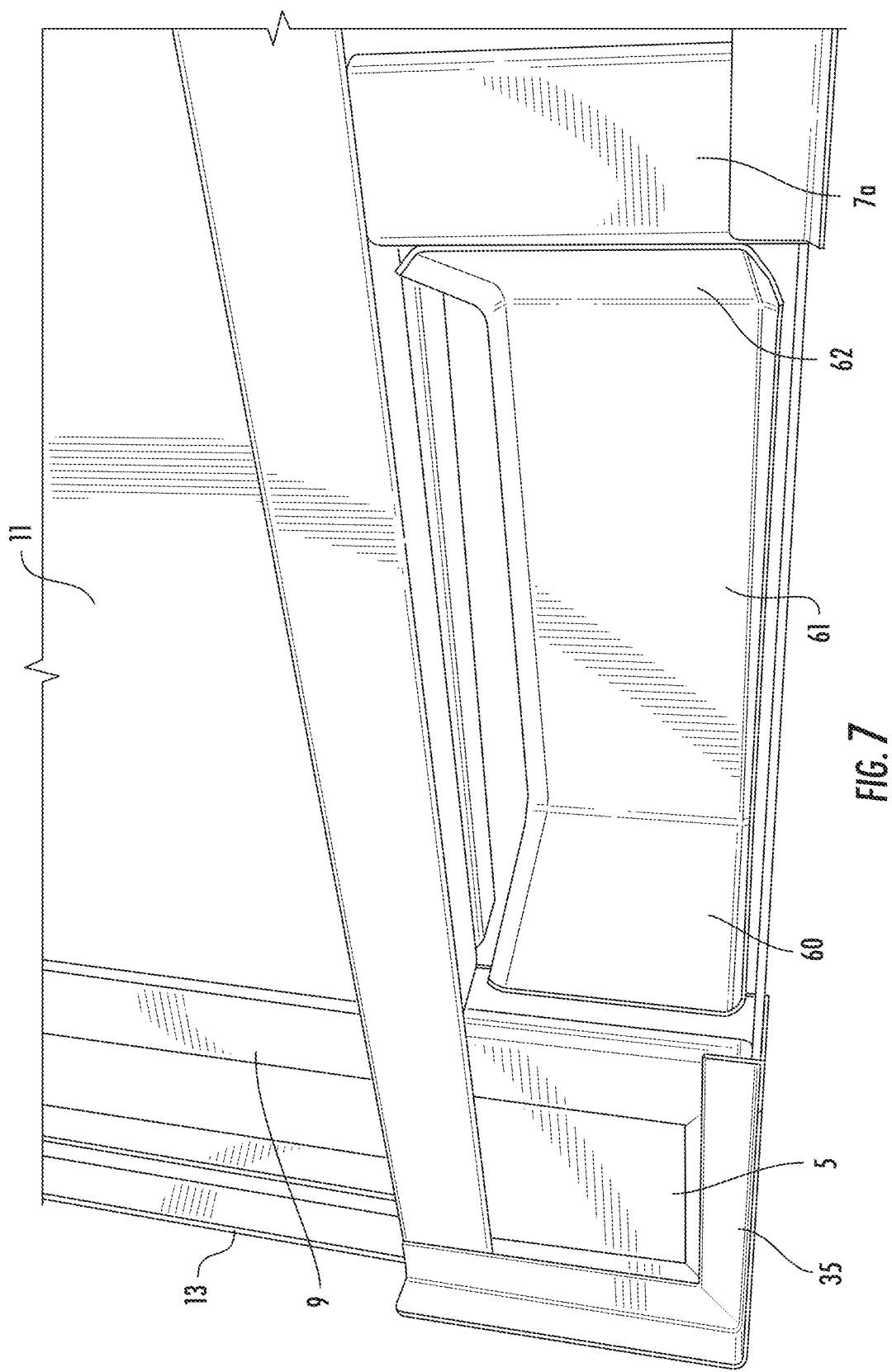
FIG. 7 shows a perspective view of the base pallet leg with right angle corners.
Figure 8:
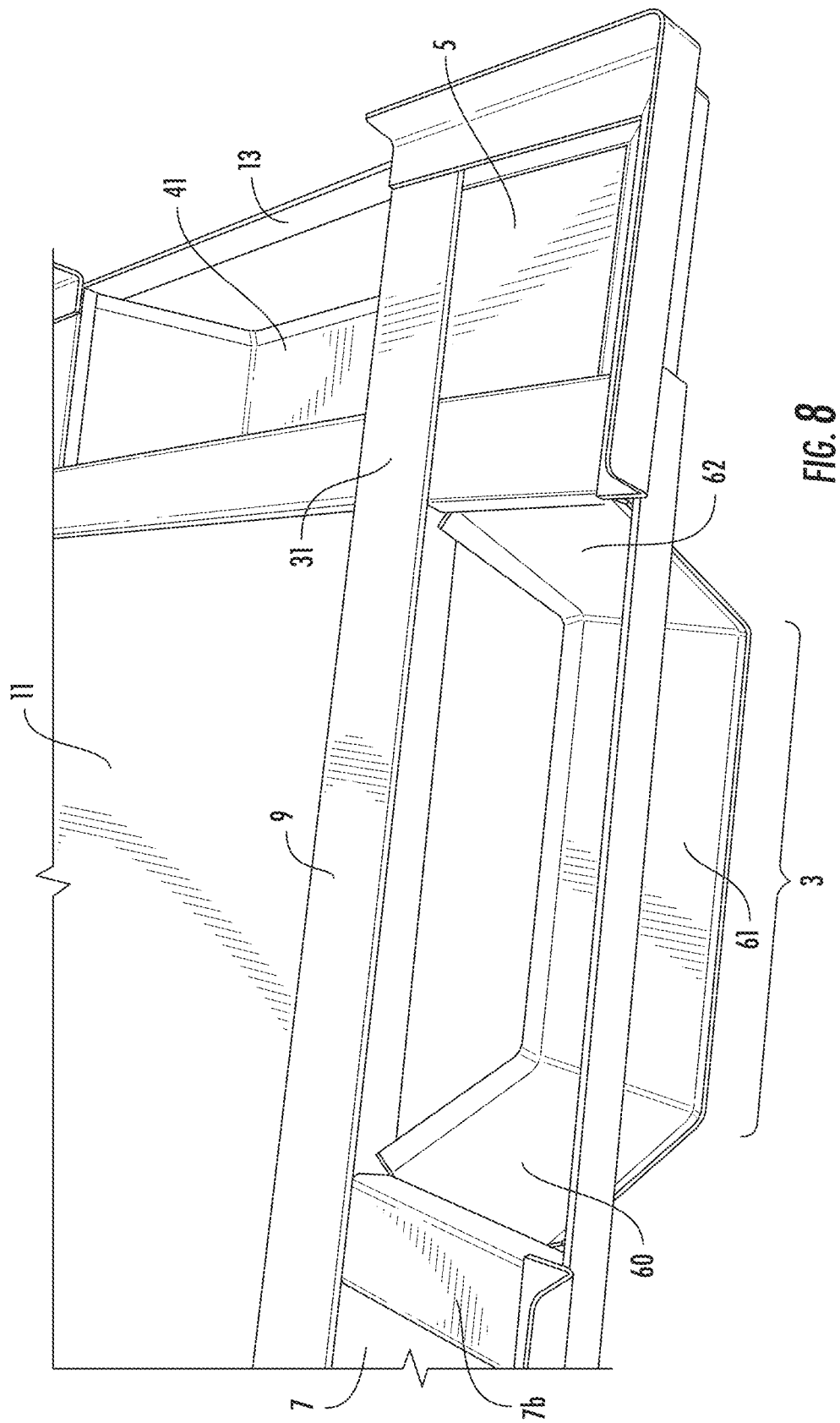
FIG. 8 shows a perspective view of the base pallet leg with right angle corners.
Figure 9:
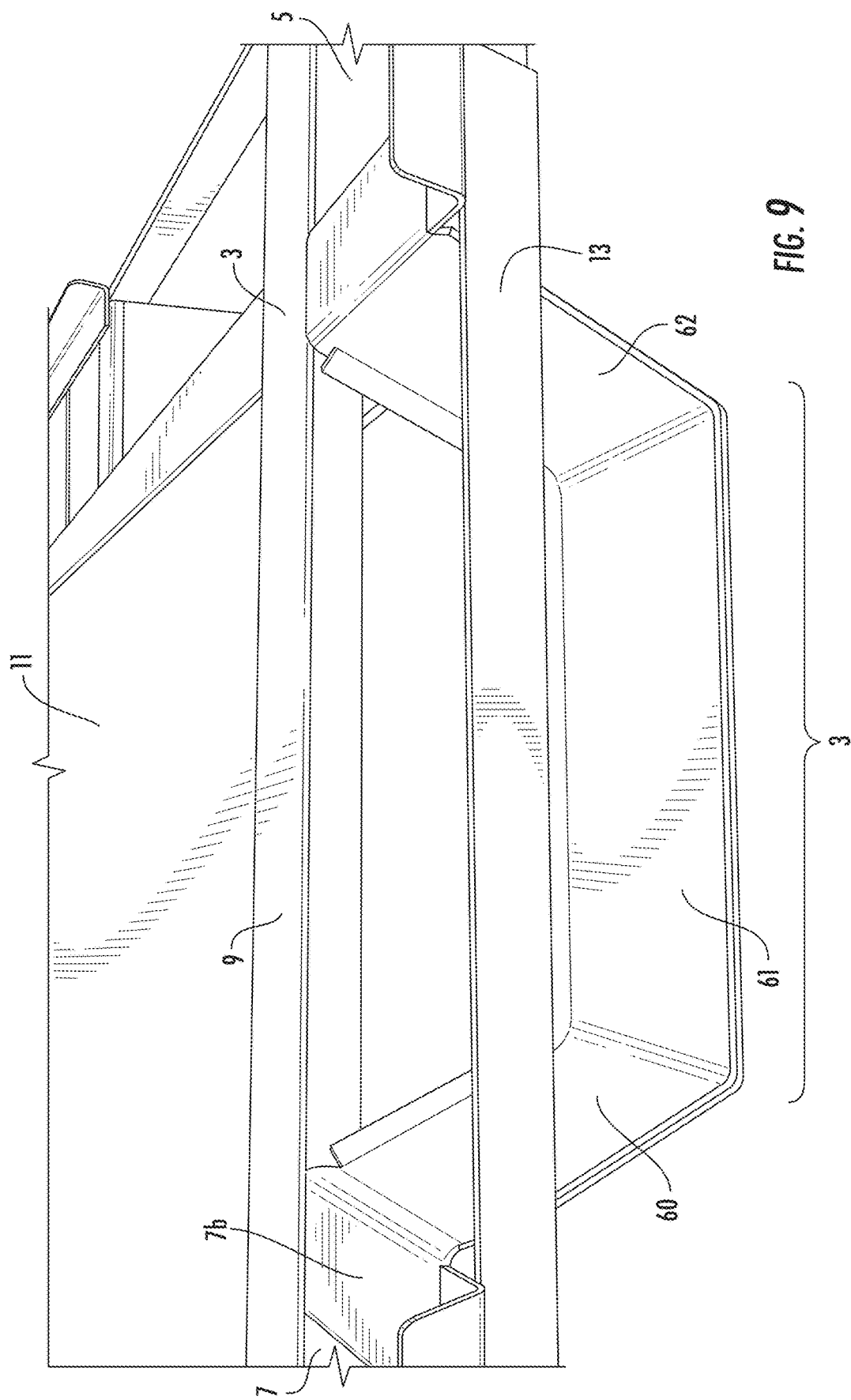
FIG. 9 shows a perspective view of the base pallet leg with right angle corners.

The pallet system has two components: a reusable metal base pallet, and a reusable collapsible corrugated carton or box. These components will be discussed in detail below.

The metal base pallet is rectangular in shape, preferably square, having four sides and four corners. Eight ski-shaped "leg members" support the pallet, two on each of the four sides of the metal base pallet. The legs contribute to easy overlap when one or more metal base pallets are stacked.

The metal base pallet is slightly larger in perimeter dimensions than the carton. The carton can thus be set on top of the metal platform of the pallet. The leg members are positioned at the outermost perimeter of the pallet, and these leg members, in combination with a plurality of angle bars on top of the leg members, hold the carton securely in position.

When the pallet system is arranged in a stacking position, the leg members of an upper-tier metal platform will always rest on the top edge structure of the lower-tier carton in an interlocking position. This configuration prevents the upper-tier structure from moving or jumping rail in an advantageous manner over the conventional wooden pallet systems currently in use.

FIGS. 1-5 show a metal base pallet 1, in an embodiment which has eight ski-shaped legs 3, with two legs on each side of the metal base pallet 1. Metal base pallet 1 includes an outer perimeter frame 15, formed by side bars 13 that span the full length along a perimeter side of metal base pallet 1 coupled to corner angular member junctions 5. Corner angular member junctions 5 are composed of a mild steel plate and are a hexagonal shaped rounded corner in an embodiment, or in another embodiment angular member junctions 5 are 90-degree, right angles at the corners of the outer perimeter frame 15. The side bars 13 are formed of flat metal bars although it is preferable to have a single flat bar in a single length.

The side bars 13 on each side of the metal base pallet 1 are coupled to a middle angular member junction 7, on each side, comprising, in some embodiments, a mild steel plate located between, and contiguous with, a first connecting tube 7a parallel to a second connecting tube 7b, where a first end and a second end of the connecting tubes are perpendicular to, and connecting to the inner perimeter 9, the flange 35, and outer perimeter 15 to provide support for and receive a nesting pallet. In another embodiment, a first connecting tube 7a, perpendicular to and connected to an end of the middle connecting tube 7c, the opposite end of middle connecting tube 7c connected to a second connecting tube 7b that is parallel to the first connecting tube 7a, each bar made of a mild steel tube size 25×50 mm Angular member junction 7 is located at a median point, between two angular member junctions 5 at each side of the metal base pallet 1, and situated in between the extended inner perimeter frame 9, of the outer perimeter 15. The side flat bars 13 can optionally be partitioned such that a single flat bar 13 can be made up of at least one, or two or more, flat bars.

The metal base pallet 1 is also comprised of an inner perimeter frame 9, extending to the outer perimeter frame 15, made up of four side elements connected, for example by welding, to the middle angular member junctions 7 and to the corner angular member junctions 5 and to each other at interior points 31. The side elements of the inner perimeter frame are preferably made of hollow metal tubes. The corner angular member junctions 5 and side angular member junctions 7 can be made of aluminum, stainless steel, and/or copper, or alternatively, angular member junctions 5 and 7 could be made of durable plastics.

Corner angular member junctions 5 and middle angular member junctions 7 have an upward-extending flange 35 preferably composed of metal or pressed metal with an angle greater than or equal to 90 degrees. These flanges serve to secure and locate the container 2, when pallets 1 are nested, the flanges 35 effectively conceal the square framework along the perimeter of the metal base pallet 1. Flanges 35 are located in periphery, along the outermost side, of corner angular member junctions 5 and side angular member junctions 7. In an alternate embodiment, the metal base pallet 1 without the corner angular member junctions 5 and middle angular member junctions 7 is still functional.

In a preferred embodiment, the corner angular member junctions 5 and side angular member junctions 7 are made of mild steel in 25×25 mm dimensions, whereas the corner angular member junctions 5 are mild steel plate of thickness 3 mm, and the corner angular member junctions 5 make 90 degree right angles. In this embodiment, the arrangement of corner angular member junction 5 and side angular member junctions 7 minimizes height in the packaging where as more empty pallets can be nested space efficiently in a stack.

A platform 11 is mounted within the inner perimeter frame 9. The platform 11 serves as a base in the metal pallet 1 and is preferably made of a material which is lightweight and durable. In a preferred embodiment, platform 11 is made of low carbon steel (Mild Metal) that typically contains 0.04% to 0.30% carbon content. Mild Metals are one of the largest groups of Carbon Steel, and mild metal covers a great diversity of shapes and formations.

Platform 11 is supported by a beam truss 19 located on the underside of the platform 11. The beam truss 19 is fastened, for example by welding, to the bottom side of the inner perimeter frame 9 to buttress the platform 11.

The ski-shaped feet 3 of the metal pallet 1 are formed with an open center 41, which provides a space for the forks of a forklift to be inserted under the metal pallet 1. As is common in the art, the feet 3 are spaced apart along the sides of the metal pallet 1 such that spaces 41 are located correctly for the distances between the forklift forks.

Referring to FIGS. 6-9, ski-shaped feet 3 are preferably oriented for interlocking the top edge of the base carton box for two-tier stacking and can be formed as one downward projecting metal piece having two ends connected to a middle base. In this embodiment, the ski shaped foot 3, has a first downward sloping flat end portion 60 wherein the top part of the flat end portion 60 is fastened, for example by welding, to an adjacent side angular member junction 7 and to bar 13 of the outer perimeter 15. The bottom section of the downward sloping flat end portion 60 continues to the top side of ski shaped foot 61. The top side of ski shaped foot 61 extends in the direction opposite of the downward sloping flat end portion 60 and inclines into second downward sloping flat end portion 62. The top portion of the second downward sloping flat end portion 62 is fastened, for example by welding, to an inner perimeter frame 9 and to bar 13 of outer perimeter 15. The first downward sloping flat end portion 60 and the second downward sloping flat end portion 62 are oriented to face each other whereas the top side of ski shaped foot 61 is medial to both ends. The bottom side of ski shaped foot 61 contacts whatever surface the pallet 1 is supported by, and is designed to lessen the probability of scratching the ground or any other surface on which the foot might be placed.

Figure 10:
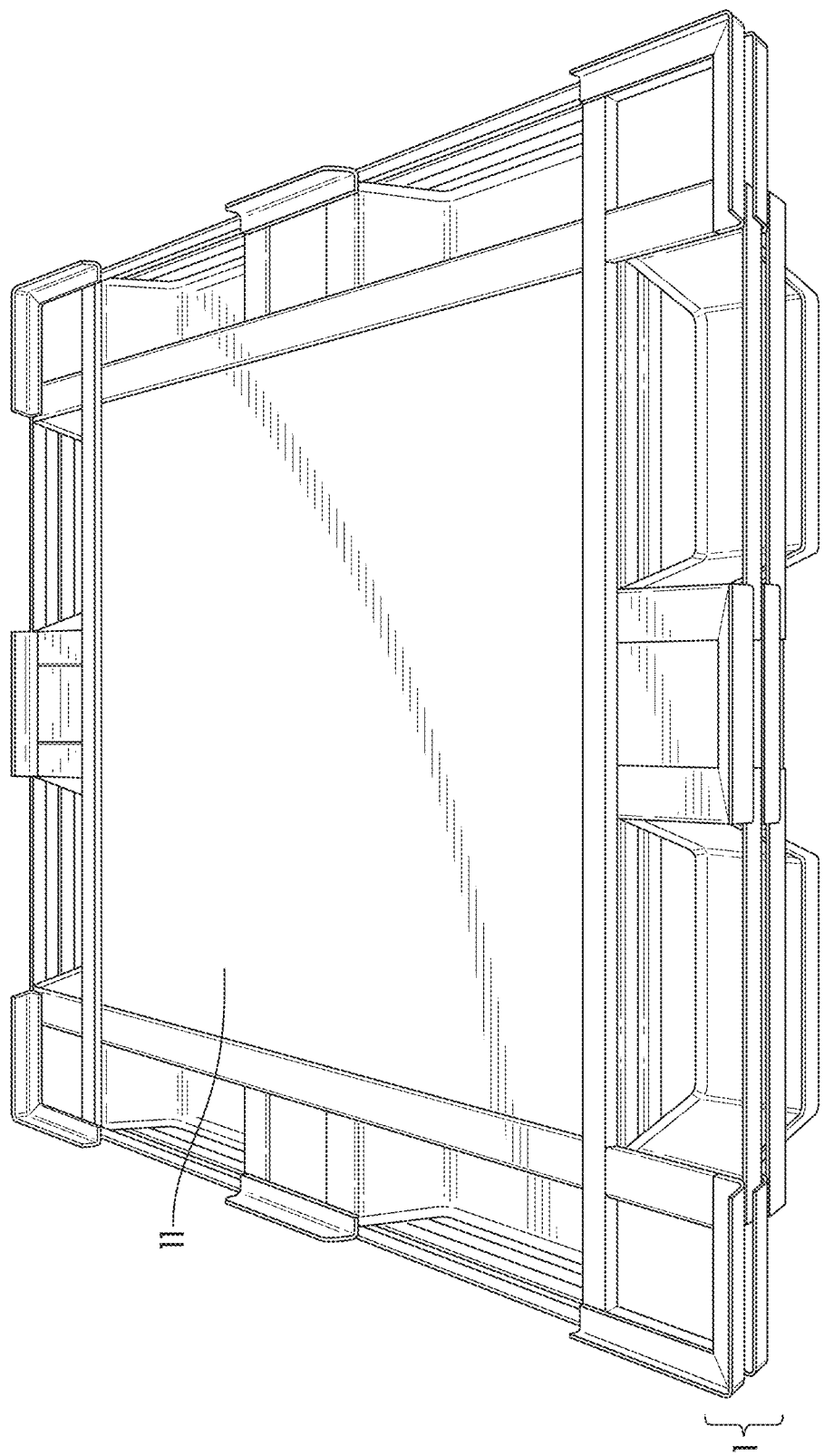
FIG. 10 shows a perspective view of nesting empty pallets with right angle corners.
Figure 11:
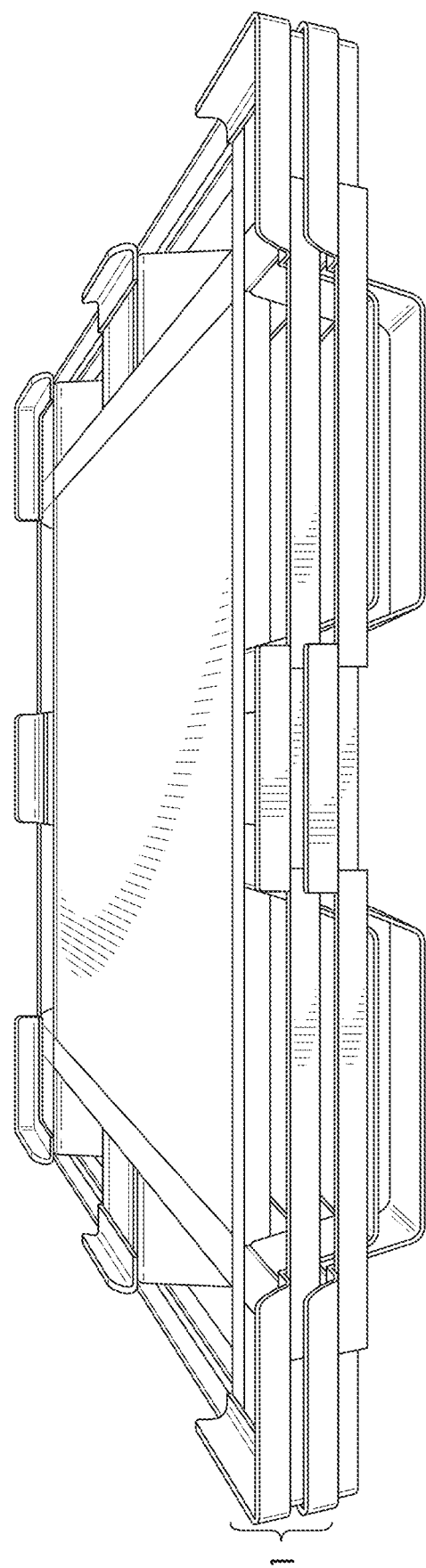
FIG. 11 shows a side view of nesting empty pallets with right angle corners.
Figure 12:
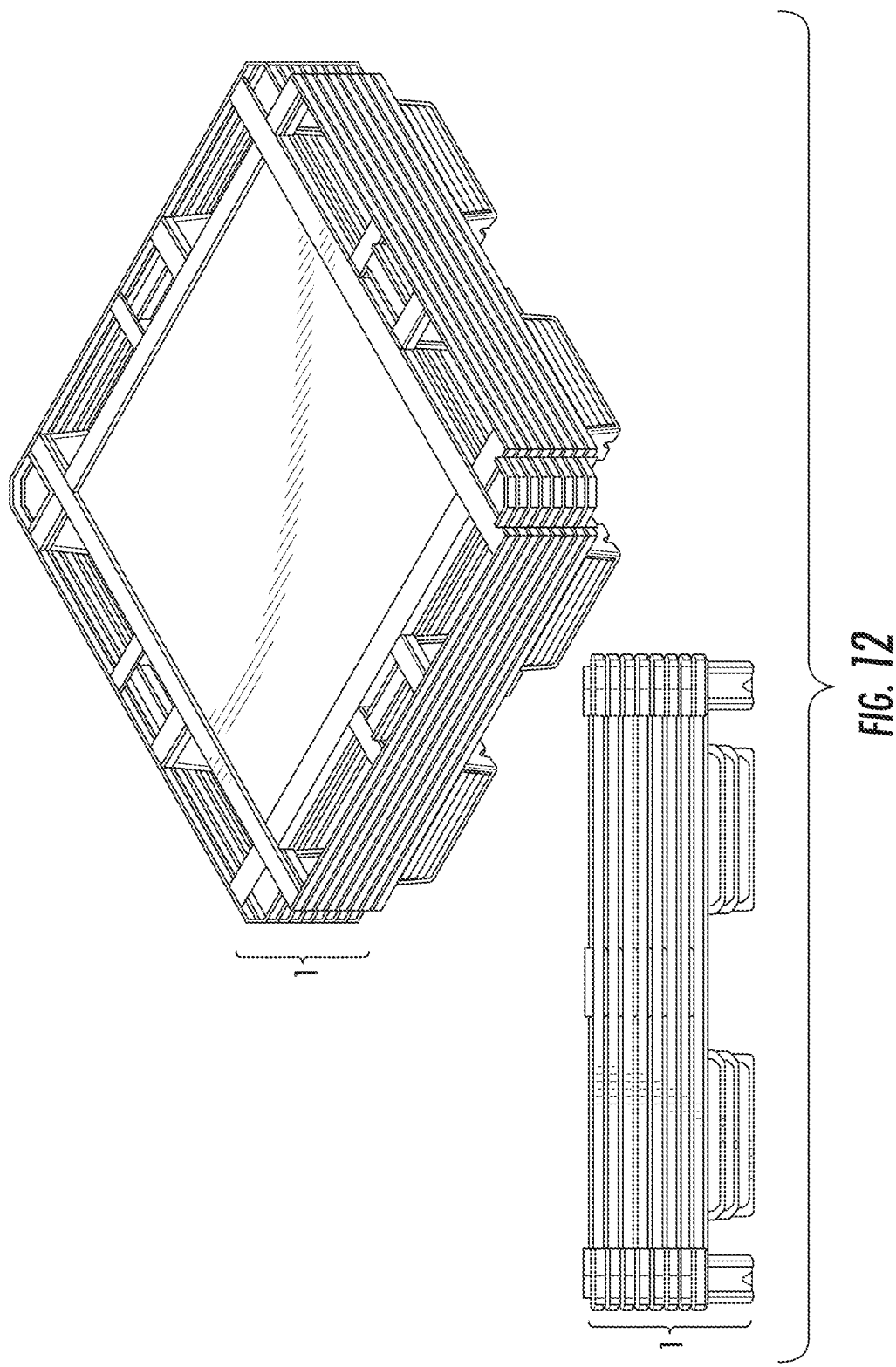
FIG. 12 shows a perspective view of a plurality of pallets, with quarter hexagonal corners, superposed.

FIGS. 10-12 show a plurality of metal base pallets 1 being superposed and nested. In a stacked configuration, a set of thirty metal base pallets 1, which is approximately chest level height, are easily retrieved by an operator using a forklift, which can then be used to move the stack of empty pallets. The maximum height of the superposed metal base pallets is constrained only by the ceiling of a container or transportation cargo space.

A narrow nesting gap is created when the bottom border on corner angular member junctions 5 and middle angular member junctions 7 of a second pallet are resting on the top border of corner angular member junctions 5 and middle angular member junctions 7 of a first pallet.

Figure 13:
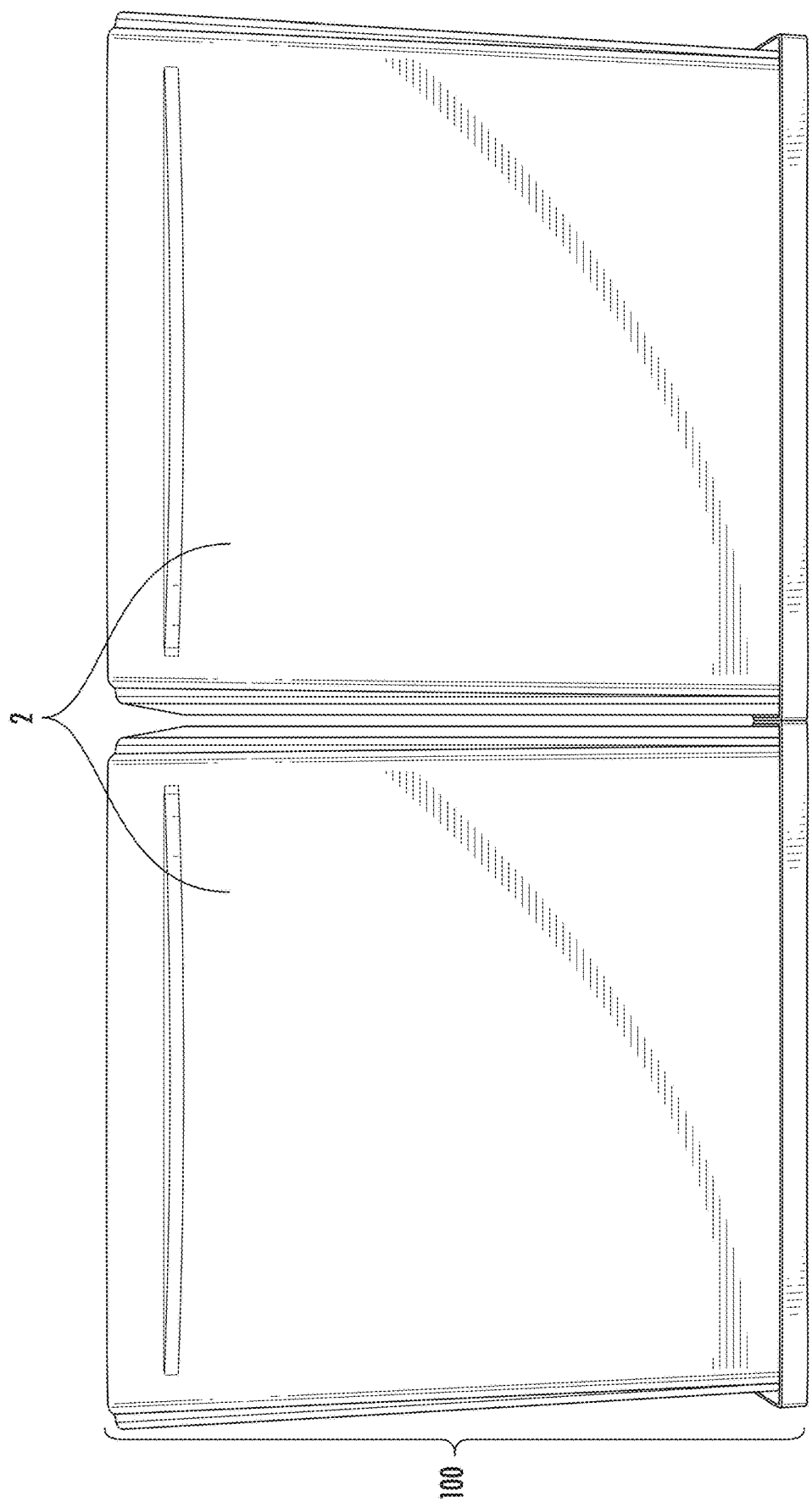
FIG. 13 shows a set of pallets of the pallet system with right angle corners.
Figure 14:
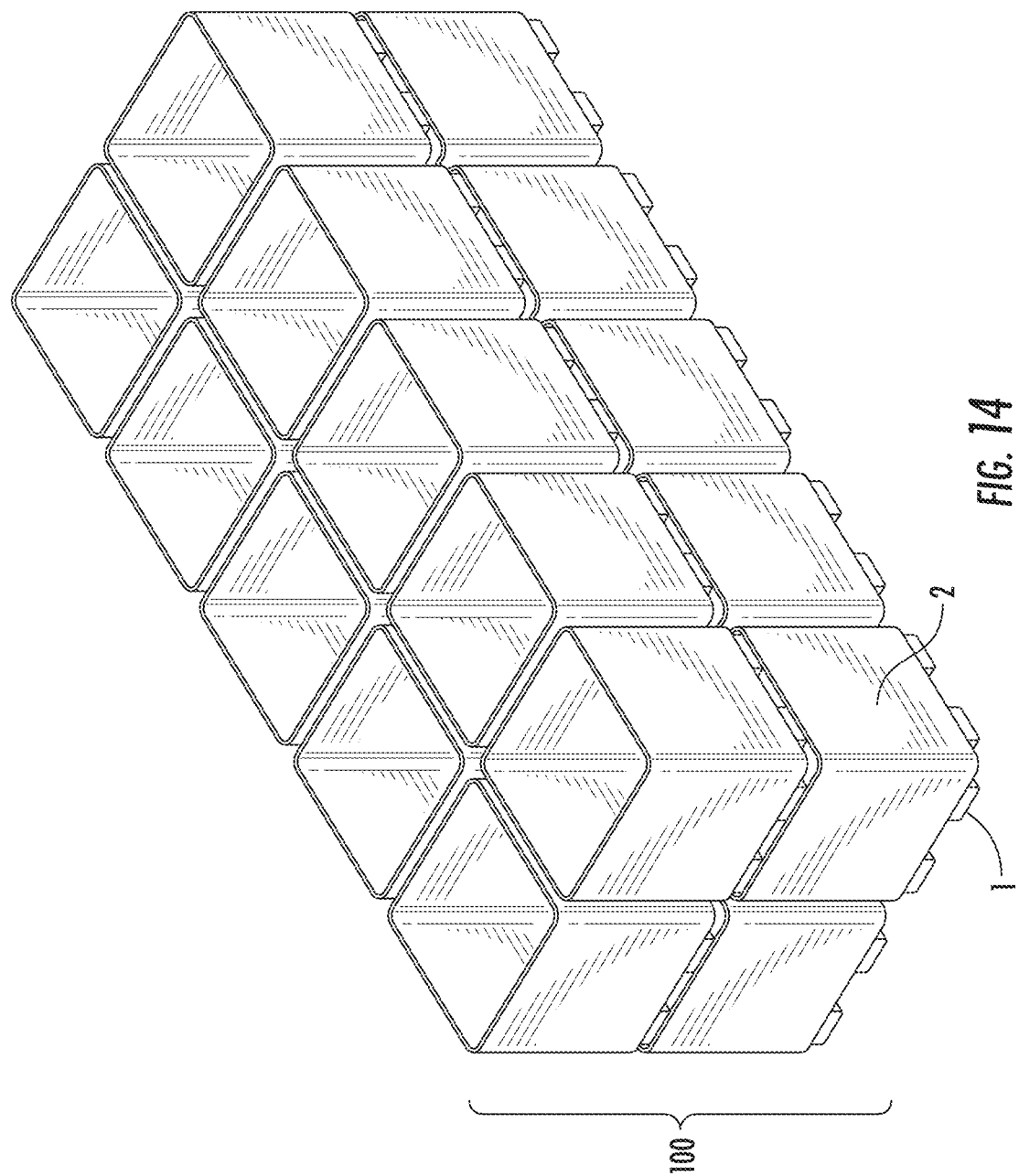
FIG. 14 shows a perspective view of a plurality of the base pallet system superposed.

FIGS. 13-14 show the pallet system 100 of the present invention. Pallet system 100 is a combination of a metal base pallet 1, as described above, and a carton 2, forming the walls of the pallet system 100. Carton 2 is preferably an accordion folded collapsible carton mounted on, and integrated to, the platform of metal base pallet 1. In a preferred embodiment, the carton 2 is easily fastened or bonded to the base metal pallet 1. The carton 2 is preferably foldable, and when unfolded, sits erect and on top of the metal base pallet 1. The carton 2 is preferably affixed to the outer perimeter framework 15 of pallet system 100. Ski shaped legs 3 on metal base pallet 1 support the framework of pallet system 100.

Corner angular member junctions 5 and middle angular member junctions 7 function to secure carton 2 on the metal base pallet 1 in pallet system 100, while not significantly increasing the height of the pallet system 100. This maximizes the number of pallets in a container or transportation container. The height of the walls of the carton 2 is preferably chosen such that the total height of a selected number of tiers of the pallet system 100, when stacked, will fit into the shipping container with minimal unused height.

When the metal base pallet 1 of pallet system 100 is used as part of tiered packing system, the frame formed by corner angular member junctions 5 and middle angular member junctions 7 reduces the likelihood that carton 2 would collapse, by securing within the perimeter of pallet system 100. This permits a greater load distribution to the square framework of metal base pallet 1 of the pallet system 100.

Corner angular member junctions 5 can, if desired, be used as a guide during stacking of pallet system 100.

After use, metal base pallet 1 and carton 2 of pallet system 100, can be returned back to the originating location, thus making the pallet system 100 cost effective, and environmentally sustainable.

In another embodiment, an independent flat piece of material can be used as cover for the top exposed portion of pallet system 100. In yet another embodiment, an additional platform piece can be used and placed directly on platform 11 of pallet system 100, within corner angular member junctions 5 and middle angular member junctions 7 to enlarge the platform area.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A reusable metal pallet comprising:
    a rectangular outer perimeter frame having four corners and four side bars, each corner comprising a corner angular member junction, each of the side bars having a length and two ends, each end of each side bar being coupled to a corner angular member junction at a corner of the rectangular outer perimeter frame;
    a rectangular inner perimeter frame located inside the rectangular outer perimeter frame, having four side elements, each of the side elements having a length and two ends, each end of each side bar being coupled to the corner angular member junction at a corner of the rectangular outer perimeter frame;
    four middle angular member junctions located between the rectangular inner perimeter frame and the rectangular outer perimeter frame, each middle angular member junction being coupled to a side bar of the rectangular outer perimeter frame midway between the two ends of the side bar and to a side element of the rectangular inner perimeter frame midway between the two ends of the side element;
    each of the corner angular member junctions and the middle angular member junctions comprising an upward-extending flange; and
    eight ski-shaped feet mounted to the side elements of the inner perimeter frame and to the side bars of the outer perimeter frame, each ski-shaped foot comprising two ends and a middle base between the two ends forming a downward-projecting piece with an open center, each of the eight ski-shaped feet being located between a corner angular member junction and an adjacent middle angular member junction;
    the ski-shaped feet and the upward-extending flanges of the corner angular member junctions and the middle angular member junctions being arranged such that when an upper first reusable metal pallet and a lower second reusable metal pallet are stacked, the ski-shaped feet of the upper first reusable metal pallet nests within the ski-shaped feet of the lower second reusable metal pallet, and the upward-extending flanges on the lower second reusable metal pallet at least partially cover an outer surface of the outer peripheral frame of the upper first reusable metal pallet.

2. The reusable metal pallet of claim 1 in which the side bars of the outer peripheral frame are flat.

3. The reusable metal pallet of claim 1 in which the side elements of the inner peripheral frame are tubular.

4. The reusable metal pallet of claim 1 in which the side elements of the inner peripheral frame are joined to each other.

5. The reusable metal pallet of claim 1, further comprising a platform mounted to the side elements of the inner peripheral frame, covering an interior of the inner peripheral frame between the side elements.

6. The reusable metal pallet of claim 5, further comprising a beam truss supporting an underside of the platform, fastened to the side elements of the inner peripheral frame.

7. The reusable metal pallet of claim 1 in which the ski-shaped feet are spaced apart a distance such that parallel forks of a forklift fit within the open centers of the ski-shaped feet.

8. The reusable pallet of claim 1 wherein each of the middle angular junctions further comprises:
    a first connecting tube, having a first end and a second end, parallel to a second connecting tube, having a first end and a second end, whereby the first end of the first and the second connecting tube is perpendicular to, and attached to the inner perimeter frame, and the second end of the first and the second connecting tube is perpendicular to, and attached to each of the upward extending flanges and the rectangular outer perimeter frame to provide support for and receive a nesting pallet.

9. A reusable metal pallet system comprising:

a metal pallet base comprising:

a rectangular outer perimeter frame having four corners and four side bars, each corner comprising a corner angular member junction, each of the side bars having a length and two ends, each end of each side bar being coupled to a corner angular member junction at a corner of the rectangular outer perimeter frame;

a rectangular inner perimeter frame located inside the rectangular outer perimeter frame, having four side elements, each of the side elements having a length and two ends, each end of each side bar being coupled to the corner angular member junction at a corner of the rectangular outer perimeter frame;

four middle angular member junctions located between the rectangular inner perimeter frame and the rectangular outer perimeter frame, each middle angular member junction being coupled to a side bar of the rectangular outer perimeter frame midway between the two ends of the side bar and to a side element of the rectangular inner perimeter frame midway between the two ends of the side element;

each of the corner angular member junctions and the middle angular member junctions comprising an upward-extending flange; and eight ski-shaped feet mounted to the side elements of the inner perimeter frame and to the side bars of the outer perimeter frame, each ski-shaped foot comprising two ends and a middle base between the two ends forming a downward-projecting piece with an open center, each of the eight ski-shaped feet being located between a corner angular member junction and an adjacent middle angular member junction;

the ski-shaped feet and the upward-extending flanges of the corner angular member junctions and the middle angular member junctions being arranged such that when an upper first reusable metal pallet and a lower second reusable metal pallet are stacked, the ski-shaped feet of the upper first reusable metal pallet nests within the ski-shaped feet of the lower second reusable metal pallet, and the upward-extending flanges on the lower second reusable metal pallet at least partially cover an outer surface of the outer peripheral frame of the upper first reusable metal pallet; and a carton mounted to the top of the base pallet, secured to the base pallet within the upward-extending flanges of the corner angular member junctions and the middle angular member junctions.

10. The reusable metal pallet system of claim 9 in which the side bars of the outer peripheral frame are flat.

11. The reusable metal pallet system of claim 9 in which the side elements of the inner peripheral frame are tubular.

12. The reusable metal pallet system of claim 9 in which the side elements of the inner peripheral frame are joined to each other.

13. The reusable metal pallet system of claim 9, further comprising a platform mounted to the side elements of the inner peripheral frame, covering an interior of the inner peripheral frame between the side elements.

14. The reusable metal pallet system of claim 13, further comprising a beam truss supporting an underside of the platform, fastened to the side elements of the inner peripheral frame.

15. The reusable metal pallet system of claim 9 in which the ski-shaped feet are spaced apart a distance such that parallel forks of a forklift fit within the open centers of the ski-shaped feet.

16. The reusable metal pallet system of claim 9 in which the carton is foldable.

17. The reusable metal pallet system of claim 9 in which the carton is formed of corrugated material.

18. The reusable metal pallet system of claim 17 in which the corrugated material is corrugated cardboard.

19. The reusable metal pallet system of claim 17 in which the corrugated material is corrugated plastic.

20. The reusable metal pallet system of claim 17 in which the carton is permanently bonded to the pallet base.

* * * * *